United States Patent
Song et al.

(10) Patent No.: US 11,544,538 B2
(45) Date of Patent: Jan. 3, 2023

(54) PULSE DRIVING APPARATUS FOR MINIMISING ASYMMETRY WITH RESPECT TO WEIGHT IN SYNAPSE ELEMENT, AND METHOD THEREFOR

(71) Applicant: Samsung Electronics Co., Ltd., Suwon-si (KR)

(72) Inventors: Yun Heub Song, Gyeonggi-do (KR); Cheng Li, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 246 days.

(21) Appl. No.: 16/763,846

(22) PCT Filed: Nov. 14, 2018

(86) PCT No.: PCT/KR2018/013866
§ 371 (c)(1),
(2) Date: May 13, 2020

(87) PCT Pub. No.: WO2019/098659
PCT Pub. Date: May 23, 2019

(65) Prior Publication Data
US 2020/0285935 A1 Sep. 10, 2020

(30) Foreign Application Priority Data
Nov. 15, 2017 (KR) .................. 10-2017-0152098

(51) Int. Cl.
*G06N 3/04* (2006.01)
*G06N 3/063* (2006.01)

(52) U.S. Cl.
CPC ............. *G06N 3/049* (2013.01); *G06N 3/063* (2013.01)

(58) Field of Classification Search
CPC ........ G06N 3/049; G06N 3/063; G06N 3/084; G06N 3/0635
See application file for complete search history.

(56) References Cited

U.S. PATENT DOCUMENTS

| | | | |
|---|---|---|---|
| 2012/0011088 A1* | 1/2012 | Aparin | G06N 3/06 706/33 |
| 2013/0297541 A1 | 11/2013 | Piekniewski et al. | |
| 2015/0106316 A1* | 4/2015 | Birdwell | G06N 3/086 706/33 |
| 2016/0267378 A1 | 9/2016 | Eleftheriou et al. | |

FOREIGN PATENT DOCUMENTS

| | | |
|---|---|---|
| KR | 1020130036325 | 4/2013 |
| KR | 1020150034900 | 4/2015 |
| KR | 1020160063908 | 7/2016 |

* cited by examiner

*Primary Examiner* — Sung S Ahn
(74) *Attorney, Agent, or Firm* — Harness, Dickey & Pierce, P.L.C.

(57) ABSTRACT

The present invention relates to a pulse driving apparatus for minimising an asymmetric image between long-term potentiation (LTP) and long-term depression (LTD) in a hardware neural network, and a method therefor; and can minimise asymmetry between the LTP process and the LTD process, thereby improving a match rate of actual results by separately performing a first operation that performs on the LTP process, and a second operation that performs the LTP process and the LTD process.

15 Claims, 11 Drawing Sheets

PULSE DRIVING APPARATUS FOR MINIMISING ASYMMETRY WITH RESPECT TO WEIGHT IN SYNAPSE ELEMENT, AND METHOD THEREFOR

CROSS-REFERENCE TO RELATED APPLICATIONS AND PRIORITY

This patent application claims priority from PCT Patent Application No. PCT/KR2018/013866 filed Nov. 14, 2018, which claims priority from Korean Patent Application No. 10-2017-0152098 filed Nov. 15, 2017. Each of these patent applications are herein incorporated by reference in its/their entirety.

TECHINCAL FIELD

The inventive concept relates to a pulse driving apparatus and a method thereof that may minimize asymmetry for weight in a synapse element, and more specifically, a technology for minimizing an asymmetric image between Long-Term Potentiation (LTP) and Long-Term Depression (LTD) in hardware neural networks.

BACKGROUND OF THE INVENTION

In general, asymmetric behaviors between LTP and LTD in hardware neural networks have always been issues. According to several conventional studies on the issues, the conductance of phase-change material (PCM) element gradually increases in an LTP process, but rapidly decreases in an LTD process.

For example, when each training pattern including LTP noise and LTD noise is provided, the effect of the LTP noise is removed after a plurality of learning epochs, but there is a limitation that it is difficult to remove the effect of the LTD noise.

Furthermore, in general, the synapse is connected with the LTP process for a single pattern but is connected with the LTD process for other patterns. As synapses of intermediate weighting values experience the same number of LTP processes and the same number of LTD processes, the synapses may favorably maintain the weighting values. However, in practice, there is a limitation that the weight is greatly reduced due to the asymmetry between an LTP process and an LTD process.

Korean Patent Publication No. 10-2015-0034900, which is a conventional patent, is a technology related to "SYNAPTIC CIRCUIT CONNECTING NEURON CIRCUITS, AND UNIT CELL CONSTITUTING NEUROMORPHIC CIRCUIT, AND NEUROMORPHIC CIRCUIT" and discloses a technology including a first memristor performing LTP and a second memristor performing LTD to improve symmetry.

However, Korean Patent Publication No. 10-2015-0034900 discloses a configuration that drives different processes of the LTP process and LTD process in each of the two memristors connected to each other in parallel, and thus there is a limitation to minimizing the probability of LTD noise.

DETAILED DESCRIPTION OF THE INVENTION

The object of the inventive concept is to provide a technology that may provide a negative pulse or a positive pulse depending on the comparison result of the synaptic epoch and the counter number counted to the synaptic weight and may perform an operation according to different pulse schemes to minimize the probability of LTD noise.

Furthermore, the object of the inventive concept is to provide a technology that may separately perform the first operation performing only the LTP process and the second operation performing the LTP process and the LTD process, thereby minimizing the asymmetry between the LTP process and the LTD process and improving the matching rate of actual results.

According to an embodiment of the inventive concept, a pulse driving apparatus for minimizing asymmetry between long-term potentiation (LTP) and long-term depression (LTD) in a synapse element includes a pattern training unit patterning an electrical signal, using a synaptic weight for connecting hierarchically-organized neuron nodes, a determination unit comparing a counter number counted to the synaptic weight with a synaptic epoch, a first operation unit performing an LTP process on the patterned synapse when it is determined based on the comparison result that the counter number does not match the synaptic epoch, and a second operation unit performing the LTP process and an LTD process on the patterned synapse when it is determined based on the comparison result that the counter number matches the synaptic epoch.

The determination unit may determine whether the counter number (e.g., n) counted to the synaptic weight matches the synaptic epoch (e.g., m).

The first operation unit may provide a negative pulse and may perform the LTP process for correlating of a synapse when the counter number does not match the synaptic epoch.

The first operation unit may perform the LTP process to increase an average change of an LTP synaptic weight.

The LTP synaptic weight may be increased by a potential difference from a crystallizing threshold (Vc), and an LTD synaptic weight may be maintained at a potential difference lower than the crystallizing threshold.

The determination unit may determine repeatedly whether a counter number (e.g., n+1) counted to the synaptic weight matches the synaptic epoch (e.g., m), after an operation of the first operation unit.

The second operation unit may provide a positive pulse and may perform the LTP process and the LTD process on a correlated synapse when the counter number matches the synaptic epoch.

The second operation unit may perform the LTP process to increase an average change of an LTP synaptic weight and may perform the LTD process to decrease an average change of an LTD synaptic weight.

The LTP synaptic weight may be increased by a potential difference between a crystallizing threshold (Vc) and a melting threshold (Vm), and the LTD synaptic weight may be decreased by a potential difference from the melting threshold.

The second operation unit may perform the LTP process and the LTD process after initiating the counter number counted to the synaptic weight.

According to an embodiment of the inventive concept, a pulse driving method for minimizing asymmetry between LTP and LTD in a synapse element includes patterning an electrical signal, using a synaptic weight connecting to hierarchically-organized neuron nodes, counting a counter number to the synaptic weight, comparing the counted counter number with a synaptic epoch, and performing a first operation or a second operation on the patterned synapse, based on the comparison result.

The performing of the first operation or the second operation may include performing the first operation of an LTP process on the patterned synapse when it is determined based on the comparison result that the counter number does not match the synaptic epoch.

The counting of the counter number may include counting the synaptic weight after an operation of the first operation, and the comparing of the counted counter number with the synaptic epoch may include repeatedly determining whether a counter number (e.g., n+1) counted to the synaptic weight matches the synaptic epoch (e.g., m).

The performing of the first operation or the second operation may include performing the second operation of an LTP process and an LTD process on the patterned synapse when it is determined based on the comparison result that the counter number matches the synaptic epoch.

According to an embodiment of the inventive concept, it is possible to provide a negative pulse or a positive pulse depending on the comparison result of the synaptic epoch and the counter number counted to the synaptic weight and to perform an operation according to different pulse schemes, thereby minimizing the probability of LTD noise.

Furthermore, according to an embodiment of the inventive concept, it is possible to separately perform the first operation performing only the LTP process and the second operation performing the LTP process and the LTD process, thereby minimizing the asymmetry between the LTP process and the LTD process and improving the matching rate of actual results.

Furthermore, according to an embodiment of the inventive concept, a neural network may be maintained from pattern noise for a long time, and the output result may be closer to an actual result (or full match).

DETAILED DESCRIPTION OF THE DRAWINGS

Hereinafter, exemplary embodiments of the inventive concept will be described in detail with reference to the accompanying drawings. However, the inventive concept is neither limited nor restricted by the embodiments. Further, the same reference numerals in the drawings denote the same members.

Furthermore, the terminologies used herein are used to properly express the embodiments of the inventive concept, and may be changed according to the intentions of a viewer or the manager or the custom in the field to which the inventive concept pertains. Therefore, definition of the terms should be made according to the overall disclosure set forth herein.

The inventive concept proposes a technology for minimizing the effect of asymmetry between LTP and LTD in hardware neural networks.

In a single LTD operation, the average change in conductance (G) of Phase-Change Material (PCM) is a single LTP operation and time ($\Delta G_{LTD} = m \times \Delta G_{LTP}$). At this time, the LTP and LTD operations in the conventional technology are performed to correlate synapses at each point in time (when neurons are fired after synapses), and thus the mismatch between the output result and the actual result has occurred due to the asymmetry between LTP and LTD after a plurality of repetition epochs.

Embodiments of the inventive concept may minimize the mismatch between the actual result and the output result occurred due to the asymmetry between LTP and LTD, by minimizing the number of LTD operations. At this time, the difference between the actual result and the output result may occur due to the limitation of the maximum and minimum synaptic weights and the variation in $\Delta G$ of each operation.

Hereinafter, the pulse driving apparatus and method for minimizing the image of asymmetry between LTP and LTD will be described in detail with reference to FIGS. 1 to 9.

Figure 1:
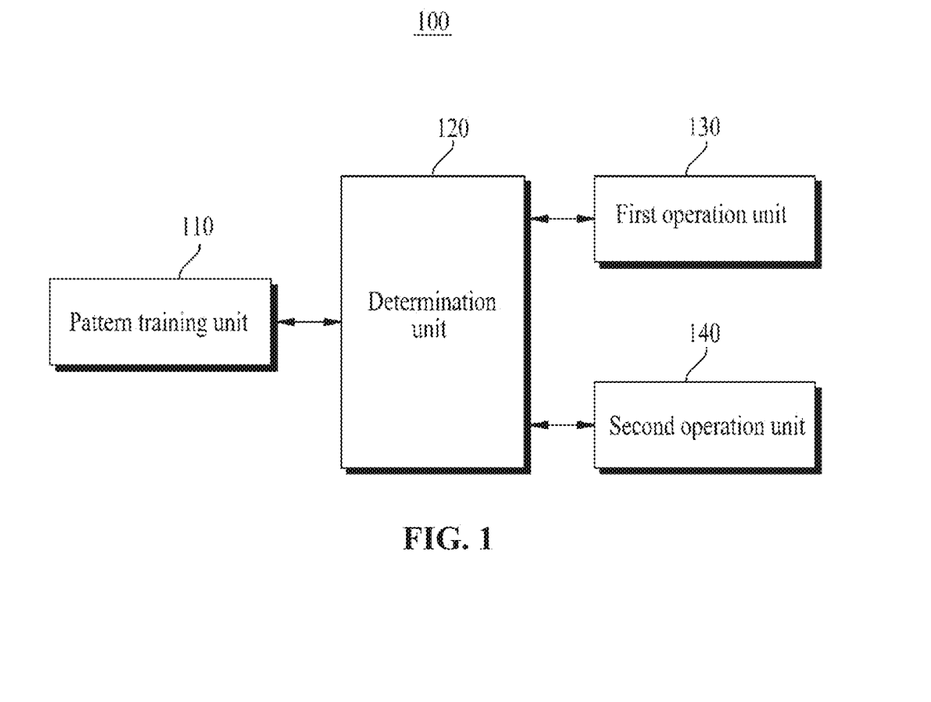
FIG. 1 is a block diagram illustrating a configuration of a pulse driving apparatus that minimizes asymmetry in a synapse element according to an embodiment of the inventive concept.

FIG. 1 is a block diagram illustrating a configuration of a pulse driving apparatus that minimizes asymmetry in a synapse element according to an embodiment of the inventive concept.

Referring to FIG. 1, according to an embodiment of the inventive concept, a pulse driving apparatus for minimizing asymmetry in a synapse element may minimize the asymmetry between long-term potentiation (LTP) and long-term depression (LTD).

As such, a pulse driving apparatus 100 according to an embodiment of the inventive concept includes a pattern training unit 110, a determination unit 120, a first operation unit 130, and a second operation unit 140.

The pattern training unit 110 may pattern electrical signals, using synaptic weights connecting to hierarchically-organized neuron nodes.

For example, synaptic weights connecting a neuron node to nodes are organized hierarchically; the pulse driving apparatus may have a structure that electrical signals entered into the neuron layer are delivered to the next layer after weights are set, continuously delivered to the next layer, and delivered finally to the final layer.

At this time, the connection of nodes of various layers in the synapse element and the strength of the connection, that is, the weight, may be obtained through a learning process. That is, after the weights of the nodes are first set by software, which is a pattern recognition or neural network algorithm, such as back propagation, and then the pattern task for external stimulus signals may be performed through Perceptron neural network model applied with the weights.

Learning by an artificial neural network refers to the learning (behavior improvement by experience or purposeful and irreversible changes in behavior) obtained by changing the efficiency of synaptic integration between neurons constituting a neural network of the brain due to experience. In particular, the back propagation method (B.p., Back Propagation) is an algorithm proposed by D. Lamelhart in 1986 and is a processing method of obtaining the transfer efficiency of synaptic integration capable of identifying the input pattern based on an operation of propagating the error between the abnormal value and the actual value of the output pattern for each input pattern to the output layer on the opposite side.

The determination unit 120 compares the synaptic epoch with the counter number counted to the synaptic weight.

For example, the initial counter number (counter number: n=0) may be assigned to the initial synaptic weight (initial weights); the counter number may be counted (+1) depending on integrate-and-fire (I&F) of patterned synapses. The determination unit 120 may determine whether the counted counter number (e.g., n) matches a predetermined synaptic epoch (e.g., m) (n=m?).

According to an embodiment of the inventive concept, the pulse driving apparatus 100 minimizing asymmetry in the synapse element performs the first operation unit 130 or the second operation unit 140 depending on the determination result of the match (n=m) or mismatch (n≠m) determined by the determination unit 120.

When the comparison result of the determination unit 120 indicates that the counter number does not match the synaptic epoch, the first operation unit 130 performs the LTP process on the patterned synapse.

For example, when the counter number does not match the synaptic epoch (e.g., when the counter number is less than the synaptic epoch), the first operation unit 130 may provide a negative pulse and may perform an LTP process for synaptic correlating.

Furthermore, the first operation unit 130 may increase the average change (Δw) of the LTP synaptic weight by performing the LTP process. In addition, because the first operation unit 130 performs only the LTP process for the correlating of the synapse and does not perform the LTD process, the average change (Δw) of the LTD synaptic weight becomes zero (0). At this time, the LTP synaptic weight is increased by the potential difference from the crystallizing threshold (Vc), and the LTD synaptic weight may be maintained at a potential difference lower than the crystallizing threshold.

Afterward, according to an embodiment of the inventive concept, the determination unit 120 of the pulse driving apparatus 100 that minimizes asymmetry in the synapse element may repeatedly determine whether the counter number (e.g., n+1) counted to the synaptic weight matches the synaptic epoch (e.g., m), after the first operation unit 130 is performed.

Furthermore, when the comparison result of the determination unit 120 indicates that the counter number matches synaptic epoch, the second operation unit 140 performs the LTP process and the LTD process for patterned synapses.

For example, when the counter number matches the synaptic epoch, the second operation unit 140 may provide a positive pulse and may perform the LTP process and the LTP process for correlated synapses. At this time, the second operation unit 140 initializes the counter number counted to the synaptic weight, and then performs the LTP process and the LTD process.

Furthermore, the second operation unit 140 may perform both the LTP process and the LTD process to increase the average change (Δw) of the LTP synaptic weight and to decrease the average change (Δw) of the LTD synaptic weight. At this time, the LTP synaptic weight may be increased by the potential difference between a crystallizing threshold (Vc) and a melting threshold (Vm); the LTD synaptic weight may be decreased by the potential difference from the melting threshold.

Afterward, according to an embodiment of the inventive concept, the determination unit 120 of the pulse driving apparatus 100 that minimizes asymmetry in the synapse element may repeatedly determine whether the counter number (e.g., n) counted (+1) to the initialized counter number (e.g., n=0) matches the synaptic epoch (e.g., after the second operation unit 140 is performed.

Figure 2:
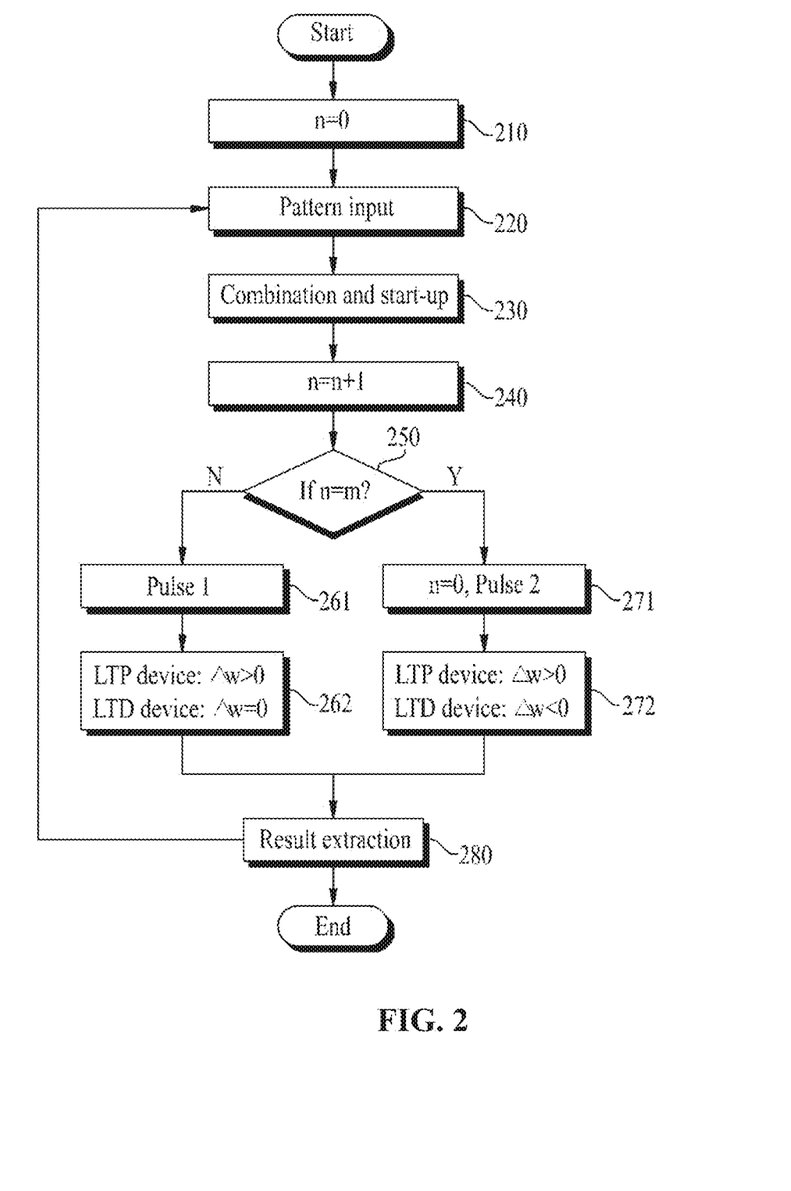
FIG. 2 illustrates an algorithm flowchart of a pulse driving method of minimizing asymmetry in a synapse element, according to an embodiment of the inventive concept.

FIG. 2 illustrates an algorithm flowchart of a pulse driving method of minimizing asymmetry in a synapse element, according to an embodiment of the inventive concept.

Referring to FIG. 2, in operation 210, an initial counter number (counter number: n=0) may be assigned to the initial synaptic weight (initial Weights).

In operation 220, according to an embodiment of the inventive concept, a pulse driving method for minimizing asymmetry in the synapse element patterns electrical signals, using the synaptic weight connecting hierarchically organized neuron nodes. Afterward, in operation 230, the pulse driving method may apply I&F to the patterned synapses. At this time, the I&F model may be a model in which only the formal electrical characteristics are considered without considering the characteristics of the complex ion channels of the neuron. Because the model only mathematizes the relationship between a current input and a voltage output, the model may be expressed in a simpler form than the Hodgkin-Huxley model. Nevertheless, because time is adopted as the basic unit of information processing, the I&F model has good performance when being applied to spatiotemporal pattern recognition.

In operation 240, the initial counter number is counted to the initial synaptic weight (counting, +1); in operation 250, it is determined whether the counted counter number (e.g., n) matches the predetermined synaptic epoch (e.g., m) (If n=m?).

When the determination result in operation 250 indicates that the counter number does not match the synaptic epoch (e.g., when the counter number is less than the synaptic epoch), "pulse 1" being a negative pulse in operation 261 is provided.

In operation 262 by "pulse 1" provided in operation 261, the LTP process is performed on patterned synapses, and the LTD process is not performed. Accordingly, in operation 262, the average change (Δw) of the LTP synaptic weight increases, and the average change (Δw) of the LTD synaptic weight becomes zero (0).

Returning to operation 250, when the determination result in operation 250 indicates that the counter number matches the synaptic epoch, "pulse 2" being a positive pulse in operation 271 is provided. At this time, in operation 271, the counter number counted to the synaptic weight is initialized (n=0).

In operation 272 by "pulse 2" provided in operation 271, the LTP process and the LTD process are performed on the patterned synapse. Accordingly, in operation 272, the average change (Δw) of the LTP synaptic weight increases; the average change (Δw) of LTD synaptic weights decreases.

Afterward, in operation 280, the result is extracted and ended. According to an embodiment, in operation 280, the pulse driving method for minimizing asymmetry in the synapse element according to an embodiment of the inventive concept may repeat the configuration of the algorithm by operating the pattern input of operation 220 again, after the operation of "pulse 1" or "pulse 2". For example, after the operation of "pulse 1" of operation 261 and operation 262, it is possible to repeatedly determine whether the synaptic epoch (e.g., m) is matched, by counting (e.g., n+1) the counter number in the synaptic weight. For another example, after the operation of "pulse 2" of operation 271 and operation 272, it is possible to repeatedly determine whether the counter number (e.g., n) counted (e.g., +1) to the initialized counter number (e.g., n=0) matches the synaptic epoch (e.g., m).

In the algorithm as illustrated in FIG. 2, the LTP process is performed at all firing events, and the LTD process is performed only at the m-th firing event. That is, according to an embodiment of the inventive concept, the pulse driving method for minimizing asymmetry in the synapse element may minimize the probability of LTD noise through the algorithm illustrated in FIG. 2; according to an embodiment, LTD may occur during the operation of the algorithm. However, even though the LTD occurs, the effect thereof may be removed through the subsequent (m−1) LTP process operation.

Figure 3:
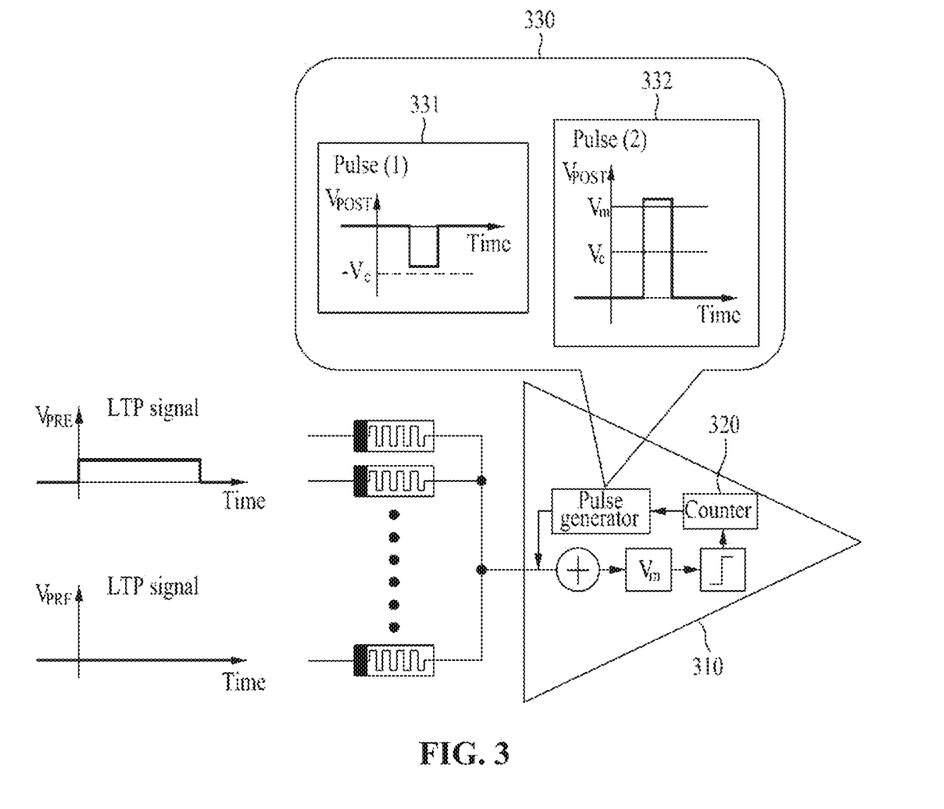
FIG. 3 illustrates an example of a circuit according to an embodiment of the inventive concept.
Figure 4:
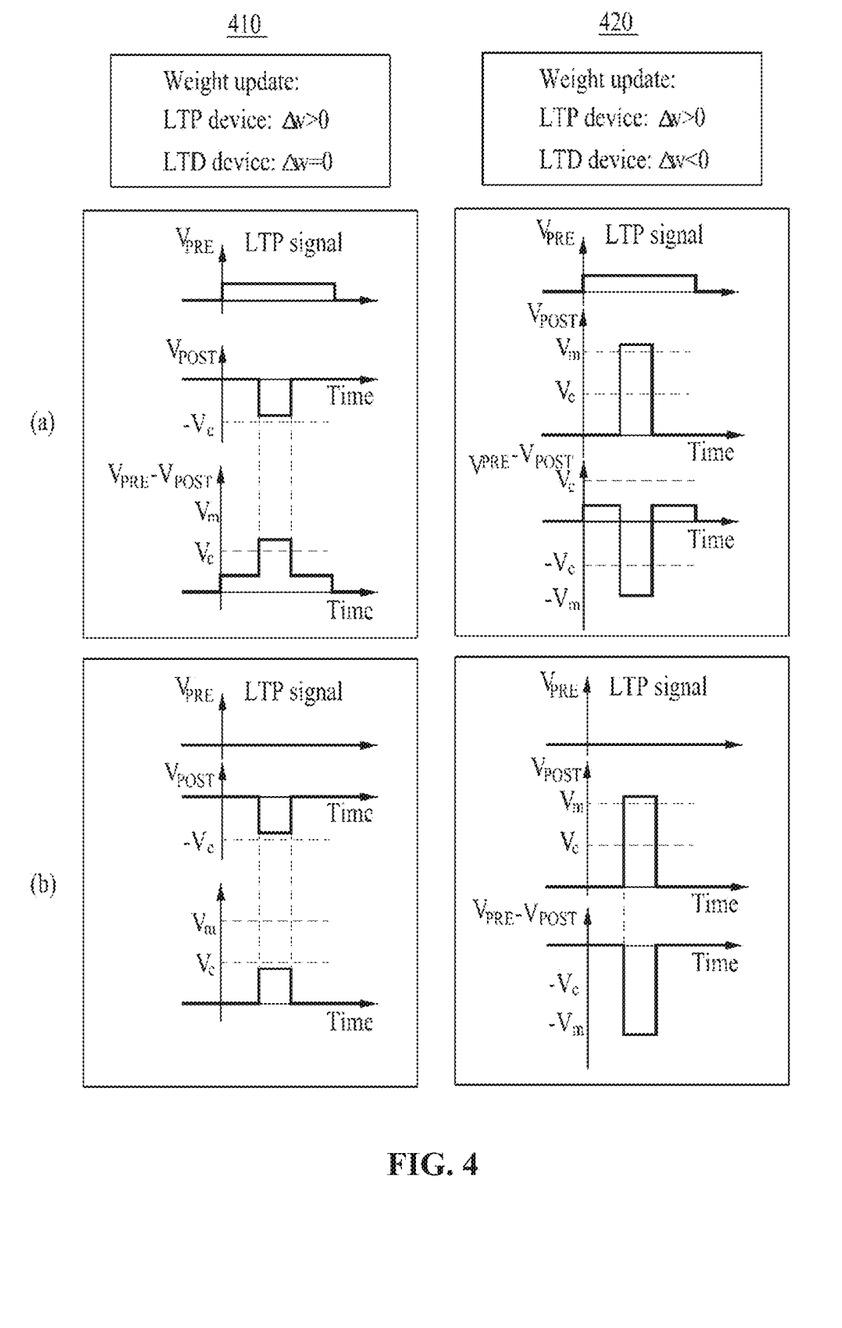
FIG. 4 illustrates an example of a pulse effect according to an embodiment of the inventive concept.

FIG. 3 illustrates an example of a circuit according to an embodiment of the inventive concept. FIG. 4 illustrates an example of a pulse effect according to an embodiment of the inventive concept.

In detail, FIG. 3 illustrates an example of a circuit for driving an algorithm according to an embodiment of the inventive concept. FIG. 4 illustrates an example of the pulse shape and weight updating effect according to a circuit.

Referring to FIG. 3, the I&F neuron circuit 310 according to an embodiment of the inventive concept includes a counter 320 and a spike generator 330, other than a basic I&F function blocks. At this time, two types of pulses (e.g., "pulse 1" 331 and "pulse 2" 332) are provided as reverse spikes, which may be selected by the counter 320.

The basic I&F function blocks are not limited.

For example, when the counter number (n) is less than the synaptic epoch (m), "pulse 1" 331 is provided to operate only the LTP process. For another example, when the counter number (n) is the synaptic epoch (m), the counter number is reset to 0, and "pulse 2" 332 is provided to operate both the LTP process and the LTD process.

At this time, "pulse 1" 331 is performed in all the $1^{st}$ to $(m-1)^{th}$ firing events; "pulse 2 332" is performed only at the $m^{th}$ firing event.

Referring to FIG. 4, examples of a pulse shape and a weight updating effect for "pulse 1" 410 and "pulse 2" 420 are illustrated.

For example, pre-synaptic neurons associated with on-pixels may provide positive pulses having the amplitude, which is too small to maintain synaptic weights and may provide correlating synapses of LTP. In addition, the pre-synaptic neurons associated with off-pixels may provide negative pulses (or no pulses) and may provide correlating synapses of LTD.

Furthermore, when "pulse 1" 410, which is a negative pulse for the crystallizing threshold (Vc), is provided, the LTP synaptic weight is increased by the potential difference from the crystallizing threshold (Vc), and the LTD synaptic weight is maintained at a potential difference lower than the crystallizing threshold. Moreover, when "pulse 2" 420, which is a positive pulse exceeding the melting threshold (Vm), is provided, the LTP synaptic weight is increased by the potential difference between a crystallizing threshold (Vc) and a melting threshold (Vm), and the LTD synaptic weight is decreased by the potential difference from the melting threshold.

Figure 5:
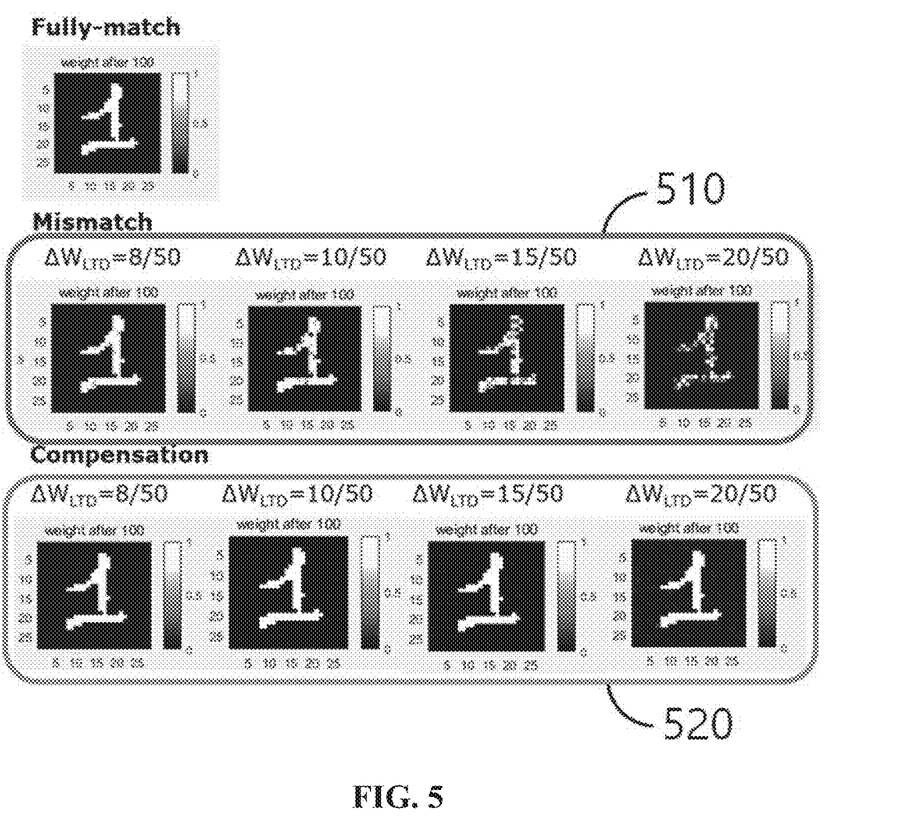
FIG. 5 illustrates a result image for an output result and an actual result.

FIG. 5 illustrates a result image for an output result and an actual result.

In detail, FIG. 5 illustrates a fully-match result image, a mismatch result image, and a proposed result image (compensation) according to the algorithm proposed by the inventive concept. The proposed result image refers to an output result performed by a pulse driving apparatus that minimizes asymmetry in a synapse element according to an embodiment of the inventive concept.

FIG. 5 illustrates the average weight difference (AWD) after 100-times learning for the algorithm according to an embodiment of the inventive concept; FIG. 5 illustrates the average change ($\Delta W_{LTD}$) of the LTD synaptic weight according to the LTD process at each of 2/50, 3/50, 4/50, 5/50, 8/50, 10/50, 15/50, and 20/50.

In the mismatch result image 510, it may be seen that noise is generated in the average change ($\Delta W_{LTD}$) of LTD synaptic weights of each of 8/50, 10/50, 15/50, and 20/50; it may be seen that the proposed result image 520 is closer to the fully-match result image (or an actual result image) than the mismatch result image 510.

At this time, AWD is calculated by the following Equation 1.

$$AWD = \frac{\Sigma |W_{(i,j)target} - W_{(i,j)reference}|}{28 \times 28}$$

The value of the average change ($\Delta W_{LTD}$) of the LTD synaptic weight in mismatch results (Mismatch) and proposed results (Compensation) may be calculated through Equation 1. For example, the average change ($\Delta W_{LTD}$) of the LTD synaptic weight of each of 8/50, 10/50, 15/50, and 20/50 in the mismatch results (Mismatch) is 0.943, 1.484, 3.304, or 5.694; the average change ($\Delta W_{LTD}$) of the LTD synaptic weight of each of 8/50, 10/50, 15/50, and 20/50 in the proposed results (Compensation) is 0.253, 0.265, 0.579, or 1.658. That is, the probability of LTD noise may be minimized by using a pulse driving apparatus that minimizes asymmetry in the synapse element according to an embodiment of the inventive concept.

FIGS. 6A, 6B, 7A and 7B illustrate experimental results at different noise ratios.

Figure 6A:
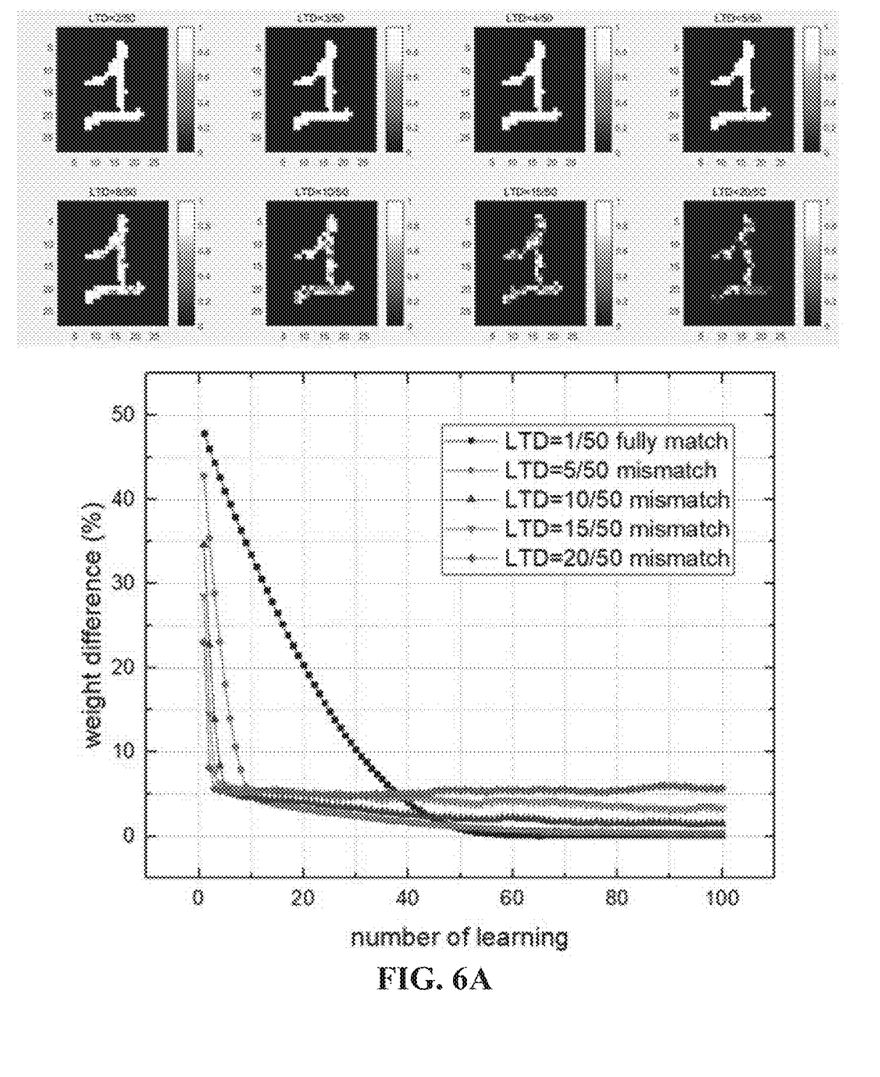
FIGS. 6A, 6B, 7A and 7B illustrate experimental results at different noise ratios.
Figure 6B:
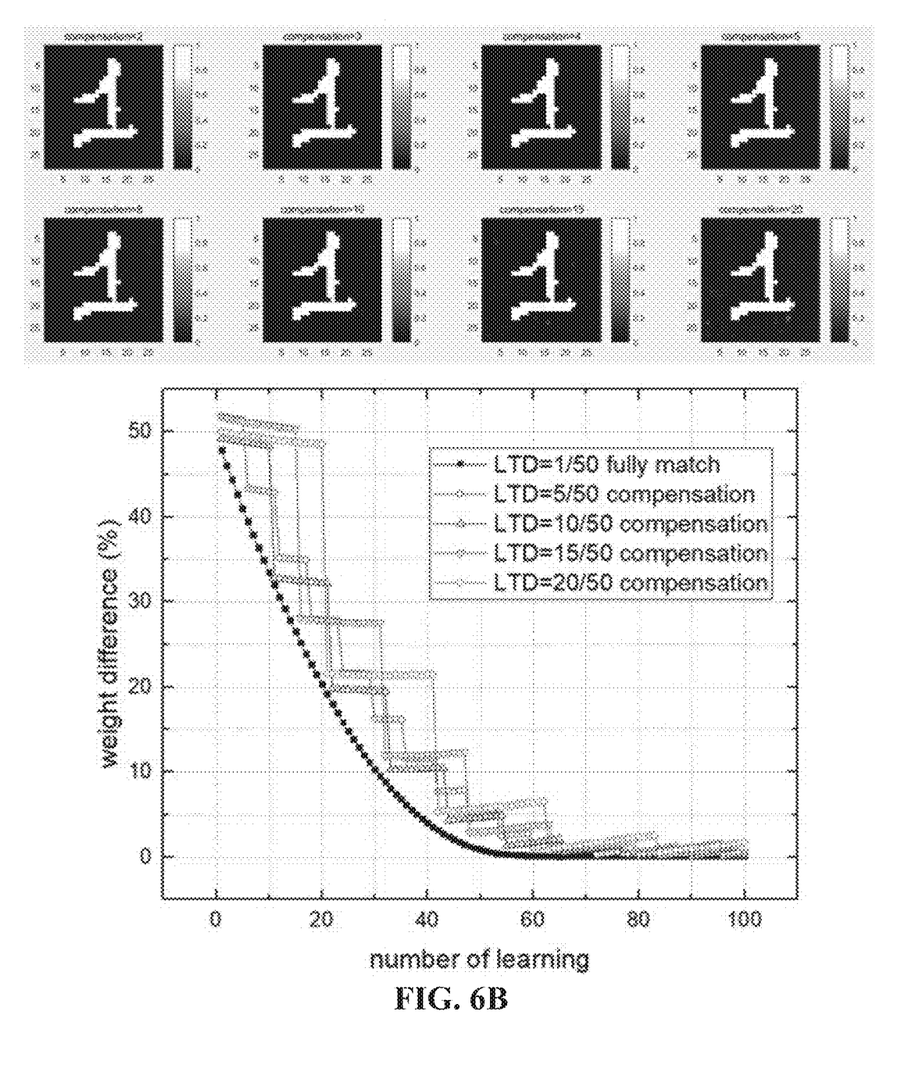
Figure 7A:
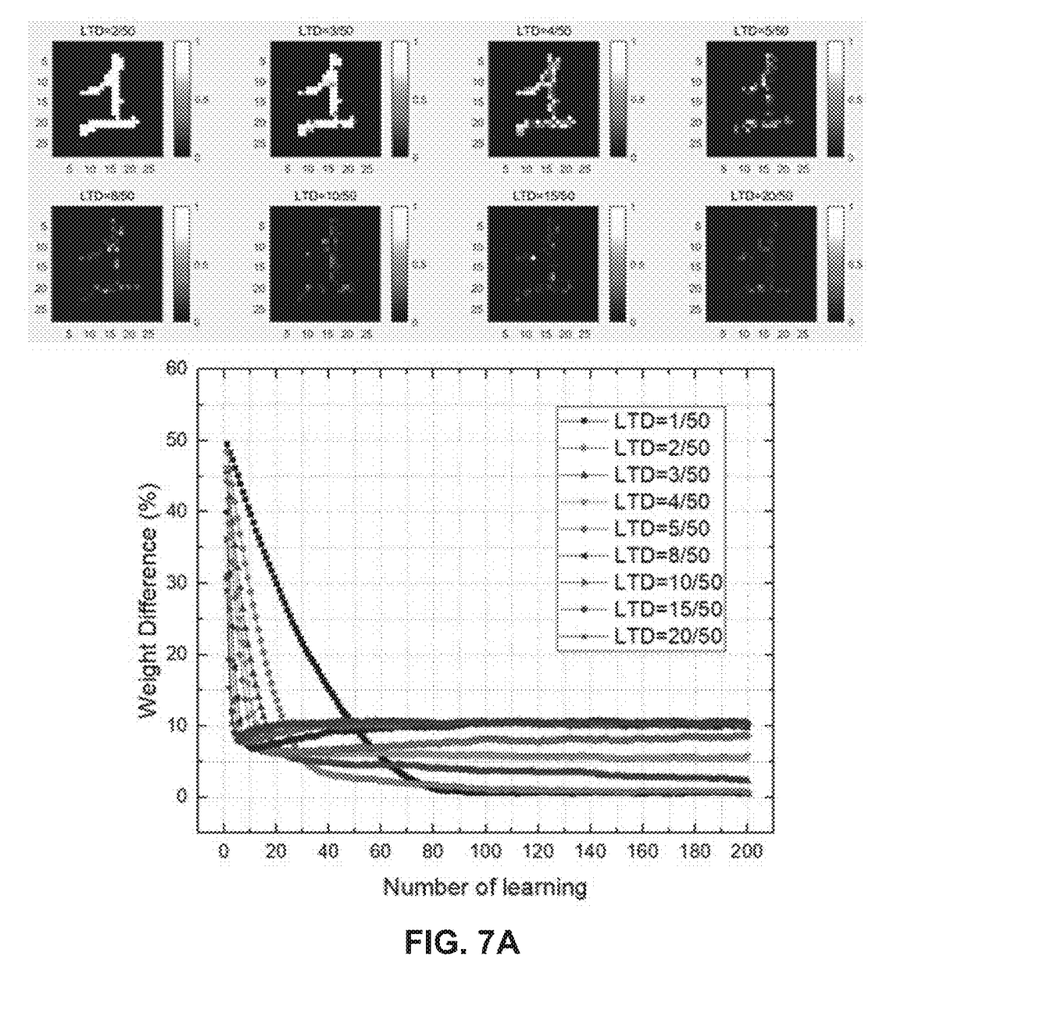
Figure 7B:
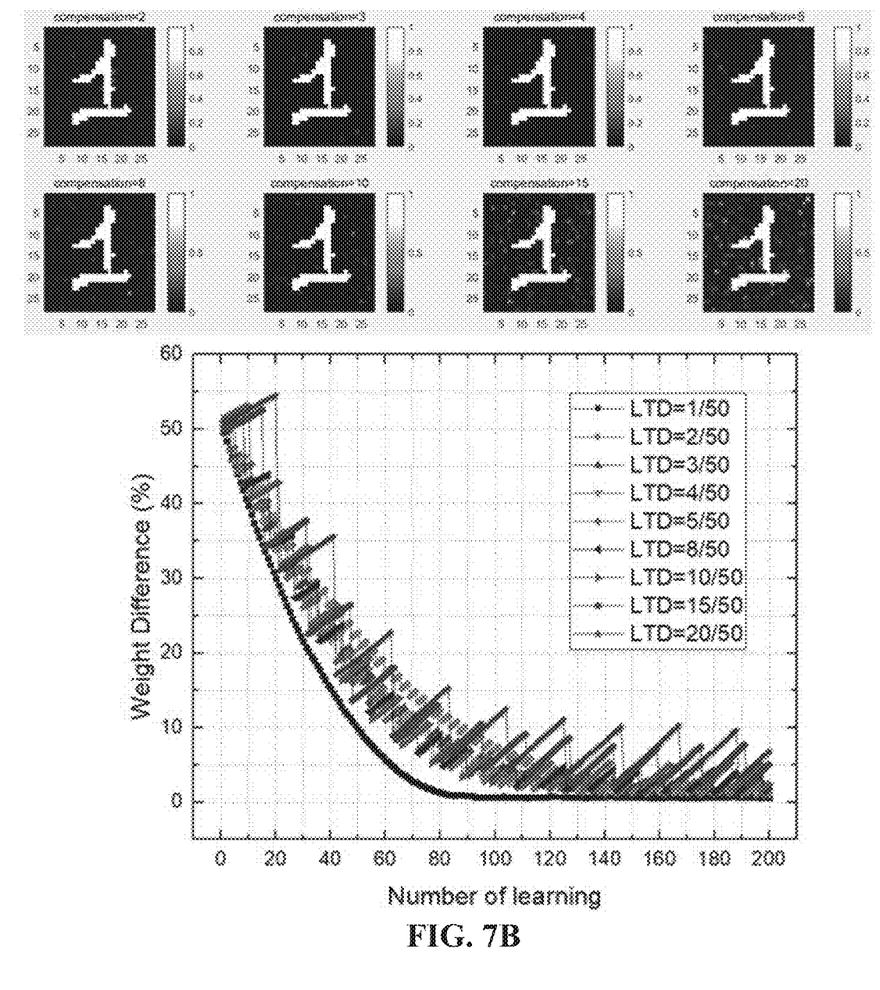

In detail, FIGS. 6A and 6B illustrate an experimental result image and an experimental result graph at a noise fraction of 6.5%; FIGS. 7A and 7B illustrate an experimental result image and an experimental result graph at a noise fraction of 20%.

At this time, FIGS. 6A and 7A illustrate mismatch results (Mismatch), and FIGS. 6B and 7B illustrate proposed results (Compensation).

Referring to FIG. 6A, it may be seen that the AWD gradually decreases depending on the number of running algorithms; it may be seen that a final AWD appears larger as the number of mismatches increases.

Referring to FIG. 6B, it may be seen that the AWD gradually decreases depending on the number of running algorithms; it may be seen that the final AWD is reduced by mismatch cases. That is, referring to FIG. 6, it may be identified that the pulse driving apparatus that minimizes asymmetry in a synapse element according to an embodiment of the inventive concept performs the proposed algorithm and thus noise endurance is improved.

FIGS. 7A and 7B illustrate the results of experiments similar to those of FIGS. 6A and 6B; the mismatch result and the proposed result illustrated in FIG. 7 illustrate that the effect of LTD noise is severe at the noise fraction of 20%.

Figure 8:
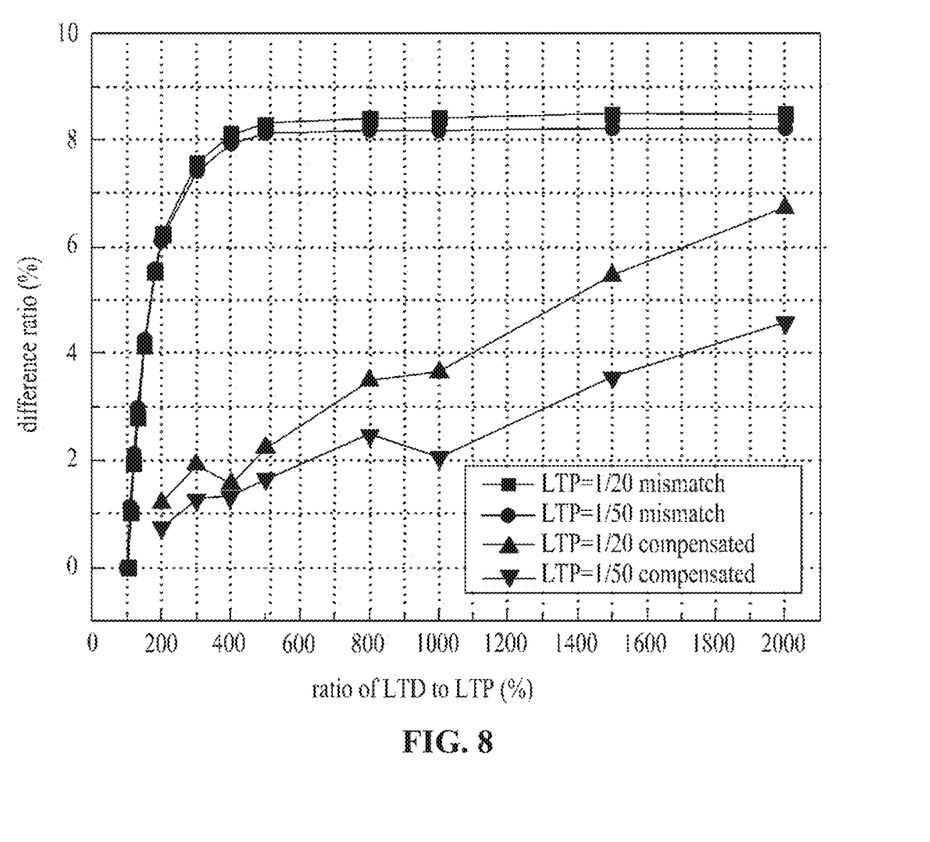
FIGS. 8 and 9 illustrate graphs of statistical analysis results according to an embodiment of the inventive concept.
Figure 9:
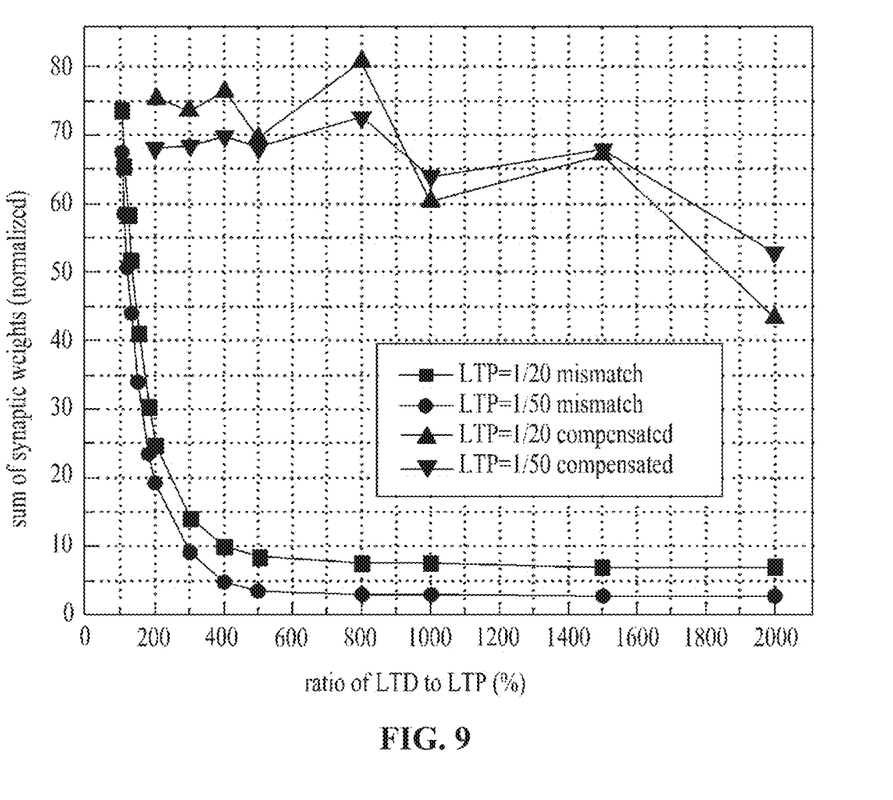

FIGS. 8 and 9 illustrate graphs of statistical analysis results according to an embodiment of the inventive concept.

More specifically, FIG. 8 is a graph illustrating the result of a difference ratio value with respect to a ratio of LTD to LTP according to an embodiment of the inventive concept;

FIG. 9 is a graph illustrating the result of the sum of synaptic weights with respect to the ratio of LTD to LTP according to an embodiment of the inventive concept.

At this time, the ratio of LTD to LTP is calculated by Equation 2 below, and the difference ratio is calculated by Equation 3 below.

$$\frac{\Delta W_{LTD}}{\Delta W_{LTP}} \times 100\%$$

Here, $\Delta W_{LTD}$ means the average change of the LTD synaptic weight, and $\Delta W_{LTP}$ means the average change of the LTP synaptic weight.

$$\frac{\Sigma |W_{(i,j)target} - W_{(i,j)reference}|}{28 \times 28} \times 100\%$$

At this time, the difference ratio denotes an average difference from a mismatch result to a fully-match result.

Referring to FIGS. 8 and 9, it may be seen that the learning result (or output result) output through the algorithm according to an embodiment of the inventive concept is close to fully-matching; it may be seen that the signal strength is close to the fully-matching case.

At this time, in the synapse element according to an embodiment of the inventive concept, a pulse driving apparatus that minimizes asymmetry may apply integer (n) times to mismatching. For example, $\Delta W_{LTD} = n \times \Delta W_{LTP}$.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may perform an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described example embodiments may be recorded in computer-readable media including program instructions to implement various operations embodied by a computer. The computer-readable medium may also include the program instructions, data files, data structures, or a combination thereof. The program instructions recorded in the media may be designed and configured specially for the example embodiments or be known and available to those skilled in computer software. The computer-readable medium may include hardware devices, which are specially configured to store and execute program instructions, such as magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMS), and flash memories. Examples of program instructions include not only machine language codes created by a compiler, but also high-level language codes that are capable of being executed by a computer by using an interpreter or the like. The described hardware devices may be configured to act as one or more software modules to perform the operations of the above-described exemplary embodiments of the inventive concept, or vice versa.

While embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

The invention claimed is:

1. A pulse driving apparatus for minimizing asymmetry between long-term potentiation (LTP) and long-term depression (LTD) in a synapse element, the pulse driving apparatus comprising:
   a pattern training unit configured to pattern an electrical signal, using a synaptic weight for connecting hierarchically-organized neuron nodes;
   a determination unit configured to compare a counter number counted to the synaptic weight with a synaptic epoch;
   a first operation unit configured to perform an LTP process on the patterned synapse when it is determined based on the comparison result that the counter number does not match the synaptic epoch; and
   a second operation unit configured to perform the LTP process and an LTD process on the patterned synapse when it is determined based on the comparison result that the counter number matches the synaptic epoch.

2. The pulse driving apparatus of claim 1, wherein the determination unit determines whether the counter number counted to the synaptic weight matches the synaptic epoch.

3. The pulse driving apparatus of claim 2, wherein the first operation unit provides a negative pulse and performs the LTP process for correlating of a synapse when the counter number does not match the synaptic epoch.

4. The pulse driving apparatus of claim 3, wherein the first operation unit performs the LTP process to increase an average change of an LTP synaptic weight.

5. The pulse driving apparatus of claim 4, wherein the LTP synaptic weight is increased by a potential difference from a crystallizing threshold (Vc), and
   wherein an LTD synaptic weight is maintained at a potential difference lower than the crystallizing threshold.

6. The pulse driving apparatus of claim 5, wherein the determination unit determines repeatedly whether a second counter number counted to the synaptic weight matches the synaptic epoch, after an operation of the first operation unit.

7. The pulse driving apparatus of claim 2, wherein the second operation unit provides a positive pulse and performs the LTP process and the LTD process on a correlated synapse when the counter number matches the synaptic epoch.

8. The pulse driving apparatus of claim 7, wherein the second operation unit performs the LTP process to increase an average change of an LTP synaptic weight and performs the LTD process to decrease an average change of an LTD synaptic weight.

9. The pulse driving apparatus of claim 8, wherein the LTP synaptic weight is increased by a potential difference between a crystallizing threshold (Vc) and a melting threshold (Vm), and
   wherein the LTD synaptic weight is decreased by a potential difference from the melting threshold.

10. The pulse driving apparatus of claim 7, wherein the second operation unit performs the LTP process and the LTD process after initiating the counter number counted to the synaptic weight.

11. A pulse driving method for minimizing asymmetry between Long-Term Potentiation (LTP) and Long-Term Depression (LTD)LTP and LTD in a synapse element, the method comprising;
   patterning an electrical signal, using a synaptic weight connecting to hierarchically-organized neuron nodes;
   counting a counter number to the synaptic weight;
   comparing the counted counter number with a synaptic epoch; and
   performing a first operation or a second operation on the patterned synapse, based on the comparison result.

12. The method of claim 11, wherein the performing of the first operation or the second operation includes:
   performing the first operation of an LTP process on the patterned synapse when it is determined based on the comparison result that the counter number does not match the synaptic epoch.

13. The method of claim 12, wherein the counting of the counter number includes:
   counting the synaptic weight after an operation of the first operation, and
   wherein the comparing of the counted counter number with the synaptic epoch includes:
   repeatedly determining whether a second counter number counted to the synaptic weight matches the synaptic epoch.

14. The method of claim 11, wherein the performing of the first operation or the second operation includes:
   performing the second operation of an LTP process and an LTD process on the patterned synapse when it is determined based on the comparison result that the counter number matches the synaptic epoch.

15. A non-transitory computer-readable storage media comprising instructions stored thereon, that when executed on a processor perform the method of claim 11.

* * * * *